A. G. M. MICHELL.
LUBRICATING BEARING.
APPLICATION FILED JUNE 8, 1916.
1,236,337.
Patented Aug. 7, 1917.
2 SHEETS—SHEET 2.
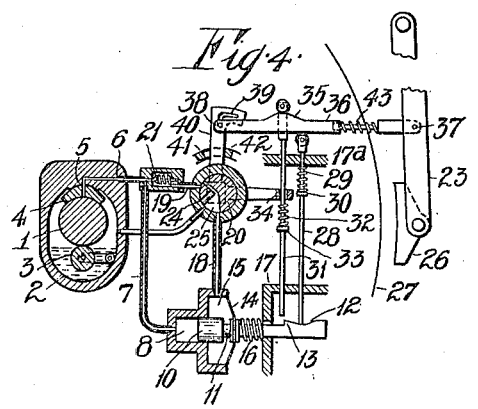
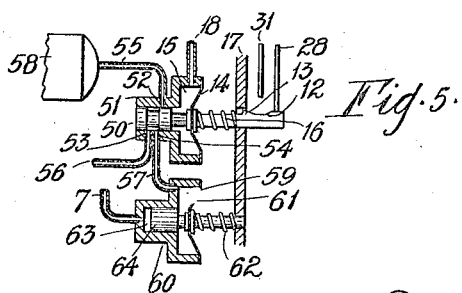
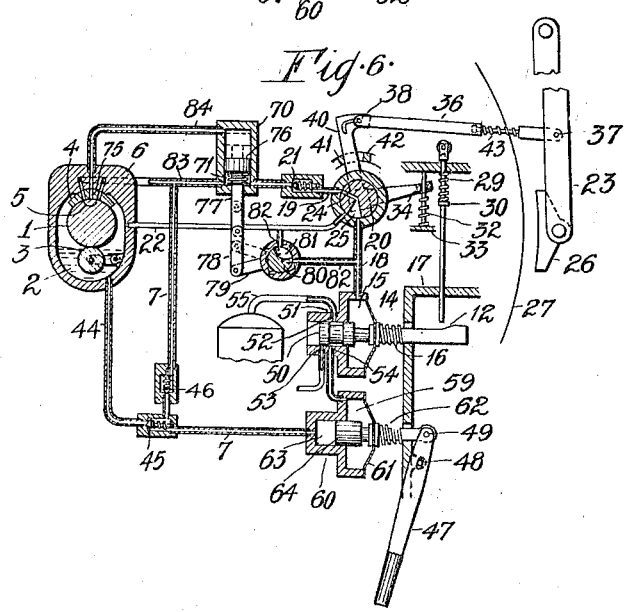
Witnesses
M. E. McDade
Inventor
Anthony G. M. Michell
by
Attorney

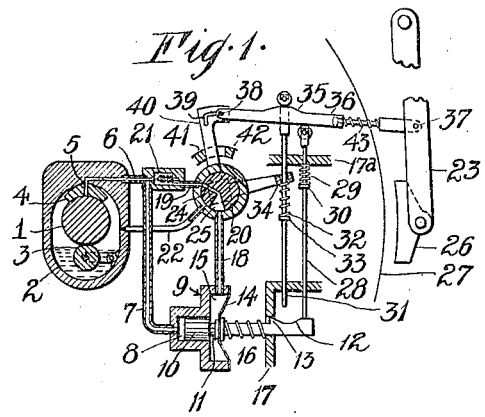
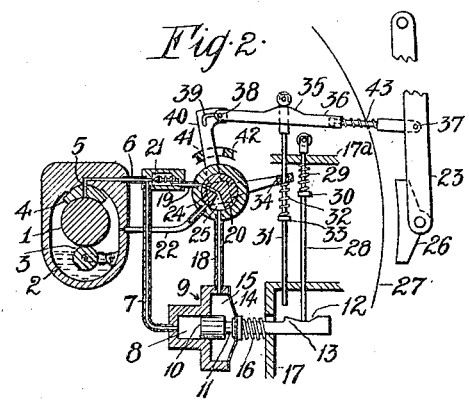
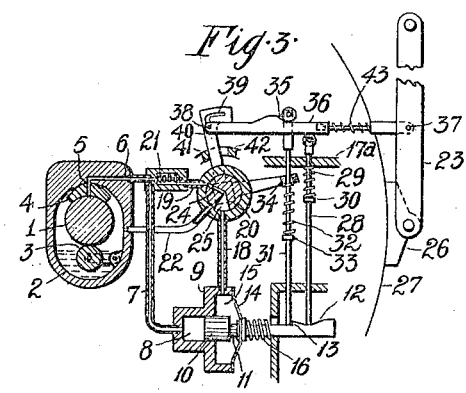

UNITED STATES PATENT OFFICE.

ANTHONY GEORGE MALDON MICHELL, OF MELBOURNE, VICTORIA, AUSTRALIA.

LUBRICATING-BEARING.

1,236,337.            Specification of Letters Patent.        Patented Aug. 7, 1917.

Application filed June 8, 1916. Serial No. 102,556.

*To all whom it may concern:*

Be it known that I, ANTHONY GEORGE MALDON MICHELL, a subject of the King of Great Britain, residing at No. 450 Collins street, Melbourne, in the State of Victoria, Commonwealth of Australia, have invented certain new and useful Improvements in Lubricating-Bearings, of which the following is a specification.

For the effective lubrication of bearings, it is now generally recognized to be essential that a continuous film of lubricant shall be maintained between the bearing or working surfaces at sufficient pressure to keep them apart, and there are known methods of designing bearings so that they shall automatically maintain the necessary pressure in the film by the relative motion of the bearing surfaces themselves. Such automatic action however necessarily fails when the relative motion either ceases or falls below a certain speed. The bearing elements then come into direct metallic contact, and in order to restart the motion additional power must be applied, because solid friction between the elements, and not merely fluid resistance, must then be overcome. Furthermore, when a bearing has to be frequently stopped and started under load, with direct contact and solid friction between the elements, the surfaces ultimately become worn to such an extent as to prevent the proper formation of the lubricating film under running conditions.

In some cases force-pumps have been provided for the purpose of supplying lubricant under pressure to the bearing surfaces during starting and stopping, but this resource is evidently not convenient for such bearings as those of railway vehicles, and in any case involves the use of auxiliary power mechanism. The object of the present invention is to achieve the same purpose by utilizing the pressure of the lubricant created during normal running speed for the purpose of subsequently feeding lubricant under pressure when the speed is reduced. Practically operative means for utilizing this pressure consists in connecting the working face of a bearing to a chamber or accumulator subjected to a pressure load into which lubricant is passed and is forced to the said working face, by the action of the accumulator load when the running speed is reduced. The forced feed flow mentioned would be automatically brought into action by the operation of the speed control device or gear of the mechanism with which the bearing is associated or by any other convenient means. In most cases such control gear takes one position during starting and normal running of the machine, and another position during slowing down and stopping, and the apparatus herein described and illustrated in the drawings, is more particularly adapted to such an application. The main switch of an electric motor and the brake lever of a vehicle are examples of control gears operated in this way, and the latter is the case which has been selected for illustration in the accompanying drawings. It is to be understood however that the bringing into action of the accumulator load can be readily adapted to different sequences of movements of the control gear, and that the invention is not limited in application to the bearings of any particular form of mechanism. Furthermore the practical applications of the invention are not in any way confined to the hereinafter described specific arrangements as same may be varied or modified to meet differing requirements in practice while still retaining the generic form of this invention.

In the drawings, which are all more or less diagrammatic:—

Figure 1 shows an apparatus applied to the journal bearing of a railway vehicle, and designed to deliver a charge of lubricant to the bearing chiefly, or solely, at starting, forced lubrication at stopping being in this case relatively unimportant.

Figs. 2, 3 and 4 show the same apparatus in various positions of its operation.

Figs. 5 and 6 show modifications of the apparatus.

In all the figures the apparatus is shown for the sake of clearness on an exaggerated scale as compared to the parts of the vehicle to which it is applied.

As shown in Figs. 1, 2, 3 and 4, the journal 1, to which the invention is applied, is lubricated from a well 2, by a floating-roller 3, or other known device. The bearing block 4, on which the journal works, is furnished with a port or ports 5, opening into its working-face, and communicating through appropriate channels and pipes 6, 7, to the chamber or cylinder 8 of an accumulator 9.

The chamber or cylinder 8 is closed in such a way as to constantly maintain a pressure therein. This may be effected in any desired manner, as by the use of a pressure loaded means, that is, means on which a pressure is constantly imposed in a direction to cause same to move inwardly of the chamber. In the construction illustrated, which is expressly intended to be of a somewhat diagrammatic character, there is disclosed as a suitable means a piston 10 working in the cylinder 8, and rigidly attached to a piston-rod 11, the latter having on its outer end a cam-face 12, and ratchet-tooth 13. The piston is here shown as loaded by means of its piston-rod 11 which passes through and is tightly secured to the center portion of a flexible diaphragm 14 that closes the outer end of a chamber 15, forming a second and enlarged chamber of the accumulator 9, said diaphragm being constantly pressed inward by the compressed spring 16, abutting on the fixed support 17.

The chamber 15 communicates through the pipes 18 and 19, and valves 20 and 21, with the port 5, or other similar port or ports, in the block 4, and also through the pipe 18, valve 20, and pipe 22 to the well 2.

The cylinder 8 and the chamber 15 are hereinafter referred to as chambers of variable volume. It is to be understood that if such a chamber is applied to contain both lubricant and compressed air, it is the variation of volume of the lubricant that is implied by such expression.

The valve 20 is operated from the brake-lever 23 of the vehicle, conjointly with the cam 12, and ratchet tooth 13, as follows:—

The parts are shown in Fig. 1 in the positions in which they stand while the speed of the vehicle increases after a stop, the brake-block 26, standing clear of the tire of the wheel 27, and both chambers 8 and 15 of the accumulator being empty after having delivered a charge of lubricant to the bearing at starting.

The lubricant being under pressure in the port 5, and channel 6, due to the automatic action of the journal, the non-return valve 21 automatically opens and allows the lubricant to flow through the pipe 19, ports 24 and 25 of the valve 20, and pipe 18, to the chamber 15. At the same time lubricant also flows through the pipe 7, to the chamber 8. Under the influence of the pressure in both chambers the piston 10 and diaphragm 14, with the attached cam-face 12 and ratchet tooth 13, are forced outward compressing the spring 16. As the cam-face 12 moves outward the tappet-rod 28 falls under the pressure of the spring 29, acting between the collar 30 on the rod 28 and the fixed support 17ª. The tappet-rod 31 is similarly pressed downward by the spring 32, acting between the collar or abutment 33 on the rod 31, and the arm 34, which is rigidly attached to and rotates with the valve-plug 20, but as long as the brake-lever 23 remains in the off-position as in Fig. 1, the tappet-rod 31 is held up by the cam-face 35 on the bar 36, which is hinged to the brake-lever 23 at 37, the bar itself being held up by its pin 38, resting in the circumferential portion of the L-shaped slot 39, which is formed in the arm 40, also rigidly attached to the valve-plug 20. The movement of the arm 40 is limited in both directions by the fixed stops 41 and 42. When the chamber 15 becomes full, the parts take the positions shown in Fig. 2 and they retain these positions and pressure is maintained in the accumulator chamber until the brakes are applied to stop the vehicle. The bar 36 then moves to the left with the brake lever 23, until the pin 38 comes over the radial portion of the L-shaped slot 39 which allows it to drop to the position shown in Fig. 3, which figure shows the condition of the apparatus from the time the brakes are applied, until they are raised for the vehicle to start again. When the brakes are applied the tappet-rod 31 falls with the bar 36 and engages the ratchet-tooth 13, as shown in Fig. 3, so that the piston 10 and diaphragm 14 are prevented from moving under the influence of the spring 16, and the lubricant is retained in the cylinder 8 and chamber 15.

In some cases the tappet-rod 31 and cam-tooth 13, may be omitted, as the non-return valve 21 can partially effect the same purpose by retaining the lubricant in the chamber 15, and thus prevent the diaphragm 14 and piston 10 from being moved. In this case, as shown in Fig. 6, the collar or abutment 33 on the rod 31 is replaced by a fixed stop serving the same purpose of an abutment for the spring 32. In any case however, only a relatively small quantity of lubricant is supplied during stopping, by the apparatus shown in Figs. 1–4, the chief supply being at starting, as follows:—When the brakes are lifted preparatory to starting, the brake-lever 23, and bar 36 move from the positions shown in Fig. 3 to those shown in Fig. 4. The cam-face 35 at the same time lifts the tappet-rod 31 clear of the tooth 13, and the pin 38 being engaged in the slot 39, moves the arm 40, and consequently the valve-plug 20 and its other arm 34, to the positions likewise shown in Fig. 4. The port 25, of the valve 20 then makes communication from the cylinder 15, through the pipe 18, to the pipe 22, so that the contents of the cylinder 15 can discharge freely to the well 2. The contents of the cylinder 15 being thus released, and the tappet-rod 31 being clear of the tooth 13, as above explained, the diaphragm 14 and piston 10 move inward under the pressure of the spring 16, and the lubricant contained in the cylinder 8, is forced through the pipe 7, channel 6, and port 5 to the working-face of the bearing-block 4. The relative dimensions of the parts are so arranged that the spring 16, can exert sufficient pressure on the lubricant in the cylinder 8, to form a continuous film over the working faces, even when the vehicle carries its maximum load. On the other hand the diaphragm 14 must be of such size that the pressure existing at the port 5, when the vehicle is running light, shall be sufficient to refill the cylinder 8 and chamber 15 against the pressure of the spring 16. The volumes displaced must be sufficient to enable the piston 10 to continue supplying lubricant to the bearing-surfaces, during the time which normally elapses between the lifting of the brakes, and the vehicle attaining such a speed that the lubrication again becomes automatic. The time of discharge may be regulated within limits by known devices as by an adjustable needle-valve disposed in either of the pipes 18 and 22.

When the cylinder 8 is emptied, the cam-face 12, having moved to the left, again lifts the tappet-rod 28, and consequently the bar 36, with its pin 38, shifting the latter from the radial to the circumferential portion of the slot 39, so that the spring 32, acting on the arm 34, is enabled to return the valve-plug 20 to the position shown in Fig. 1, and the vehicle having by this time got up speed, the cycle of operations is repeated.

In order to provide for varying travel of the brake-lever 23, due to wear of the brake-block 26 and wheel-tire 27, the bar 36 may be constructed in two telescopic parts as indicated in Figs. 1–4, a spring 43 interposed between the two parts being compressed and preventing fracture when the inward travel of the lever 23 is more than sufficient to carry the arm 40 to the end of its proper travel, *i. e.* into contact with the stop 41.

It will be understood that, if desired, a single set of apparatus as above described may be arranged to supply all the journals of the vehicle, branches being taken from the pipes 7 and 19 to each bearing, and the wells 2 of the bearings connected by piping, not shown, at a sufficiently low level to allow the lubricant, returned by the pipes 22, to equalize itself between them.

Where a single set of apparatus is used to supply a number of bearings, or where the power available is for any other reason insufficient to effect the operations described above in connection with Figs. 1–4 of the drawings, a relay may be used. In Fig. 5 which illustrates the incorporation of a relay apparatus, the chamber 15, with its diaphragm 14 has pipe connection 18, cam surface 12, tooth 13, and spring 16, all constructed and operating similarly to the parts with the same reference numerals already described. In place of the piston 10, Figs. 1–4, the piston valve 50 is actuated in the valve-cylinder 51 by the diaphragm 14, such valve-cylinder having ports 52, 53, 54, connected respectively by pipes 55, 56 and 57, to a supply of fluid under pressure, *e. g.* a compressed air reservoir as indicated by 58, an outlet for such fluid under reduced pressure, *e. g.* the atmosphere, and a chamber 59 of an accumulator 60.

The chamber 59 of the accumulator 60 is closed by a diaphragm 61 acted on by a spring 62, and the cylinder 63 of the accumulator 60 is fitted with a piston 64, and with the pipe 7, all as already described in connection with the accumulator 9, illustrated in Figs. 1–4.

The valve 50 is adapted to make connection alternately between the pressure port 52, and the chamber 59, and between the said chamber 59, and the release port 53, according as the diaphragm 14 is displaced to the right, or as shown in Fig. 5 to the left.

It will be evident that flow of the pressure fluid will take place between the valve 50 and the chamber 59 in such a way that the diaphragm 61 will immediately follow the movement of the diaphragm 14 to the right or left as the case may be. The piston 64 consequently discharges through the pipe 7 to the bearing-surfaces, a charge of lubricant according to the same sequence of operations as the piston 10 of Figs. 1–4, but according to the dimensions of the accumulator 60, and to the pressure of the fluid with which it is supplied from the reservoir 58, any desired volume and pressure of lubricant can by this means be discharged through the pipe 7, without increasing the dimensions of the valve 20, or the power required to operate it.

The arrangement shown in Fig. 6 may be used when it is required to supply a greater quantity of lubricant to the bearing during stopping, than can be provided by the action described above in connection with Figs. 2 and 3. In this arrangement an additional valve plug 80 is provided, together with suitable means for controlling the action of the apparatus according to the speed of the journal, said controlling means being shown in the present instance as constituted by a relay cylinder 70, though no limitation to that particular form of controller is intended. The valve 80 is located on the pipe 82, connecting the pipes 18 and 22, and is formed with a port 81 which in one position allows flow to take place from the chamber 15, through the pipes 18, 82 and 22 to the well 2, and thus allows the chamber 15 to be relieved of pressure independently of the valve 20. The crank-arm 79 attached to the valve-plug 80, is actuated by the piston 76 moving in the relay cylinder 70 being connected to it by the piston rod 77 and connecting rod 78. The lower end of the cylinder 70 is connected to the ports 5 of the bearing-block 4 through the pipe 83.

In this arrangement for the purpose stated below, plural ports 5 are preferably used, in place of the single port shown in Figs. 1 to 4, such ports being connected to the chamber 63 and through the valves 21 and 20 to the chamber 15. The upper end of the cylinder 70 is connected to an additional port or ports 75 in the bearing-block 4, through the pipe 84.

For the purpose of giving the required speed control the ports 5 and 75 are so located in the block 4 that when the bearing is running normally the pressure which it automatically generates in the film of lubricant is greater at the port or ports 75 than at the port or ports 5, while the reverse is the case when the bearing is being supplied with lubricant under pressure in accordance with this invention. These requirements will generally be satisfied by using two ports 5, situated one on each side of a port 75, as shown in Fig. 6, or two longitudinal rows of ports 5, on each side of and parallel to a row of ports 75.

When the vehicle is running at normal speed, the parts of the apparatus as shown in Fig. 6 being in corresponding positions to those in Fig. 2, the piston 76 is retained at the lower end of the cylinder 70 against the pressure of the spring 71 by the excess of the pressure in the port 75 over that in the ports 5 as above explained, and the port 81 of the valve 80 is closed with respect to chamber 15.

When the brakes are applied and the vehicle slows down, the apparatus taking the positions shown in Fig. 3, the pressure in the port 75 ceases at a certain speed to be appreciably greater than that in the ports 5, and the piston 76 rises under the action of the spring 71, moving the port 81 to make communication from the chamber 15 through the pipes 18, 82 and 22 to the well 2. The diaphragm 14 consequently moves inward under the pressure of the spring 16, and lubricant is expelled from the cylinder 63 through the pipe 7 to the ports 5, under pressure as already explained. The pressure at the ports 5 then becomes greater than that at the ports 75, and the piston 76 tends to move upward at increased speed to the end of its travel, and then leaves the port 81 open. The rate of motion of the piston 76, may be adjusted by a needle valve or other known device so as to prevent the flow of lubricant from the chamber 63 from ceasing, until the expiration of the time usually occupied by the vehicle in stopping.

The apparatus may be provided with auxiliary means for filling it with lubricant, or at need operating it, independently of the automatic gear above described. For these purposes the cylinder 8 or 63 is connected to the lower part of the well 2 by a pipe 44, fitted with a non-return valve 45 adapted to prevent flow out of the cylinder, the pipe 7 being fitted with a non-return valve 46 opening in the opposite direction. To the outer end rod of the piston contained in the cylinder 8 or 63 is fitted a lever 47, fulcrumed on the fixed pin 48, and engaging the piston rod through the pin 49. It will be clear that, the other parts of the apparatus being in the proper position for starting as in Fig. 4, the piston 10 or 64 may be actuated by the lever 47 alternately to draw lubricant from the well 2 through the pipe 44 and valve 45 into its cylinder and to return it under pressure through the pipe 7 and valve 46 to the bearing-surfaces, and finally restoring the parts to the positions shown in Fig. 6, to leave them in condition for continuing the normal operating cycle as above described. Instead of a manually operated lever 47, power actuated gear may be used.

I claim:—

1. In the lubrication of bearings, in combination, a lubricant feed chamber of variable volume adapted to deliver lubricant under pressure to the working face of a bearing, and means pressure loading said chamber, said means controlled by the accumulated pressure of the lubricant at said face.

2. In the lubrication of bearings, in combination, a lubricant chamber of variable volume adapted to feed lubricant under pressure, a conductor leading from said chamber to the working face of a bearing, and means pressure loading said chamber, said means controlled by the lubricant accumulated pressure of the lubricant at said face and in valvular controlled communication with said face.

3. In the lubrication of machine bearings, in combination, a lubricant chamber of variable volume adapted to feed lubricant under pressure, a conductor leading from said chamber to the working face of a bearing, and means pressure loading said chamber, said means controlled by the lubricant pressure at said face and in valvular controlled communication with said face, said valvular control actuated by the starting and stopping gear devices.

4. In the lubrication of bearings, in combination, a lubricant feed chamber of variable volume adapted to deliver lubricant under pressure to the working face of the bearing, and a further chamber of variable volume pressure loading said feed chamber and controlled by the lubricant pressure in the bearing.

5. In the lubrication of machine bearings, in combination, a lubricant feed chamber of variable volume adapted to deliver lubricant under pressure to the working face of the bearing, and a further chamber of variable volume pressure loading said feed chamber and controlled by the starting and stopping gear devices of the machine.

6. In the lubrication of bearings, in combination, a lubricant feed chamber of variable volume adapted to deliver lubricant under pressure to the working face of a bearing, and a further chamber of variable volume pressure loading said feed chamber and controlled by the lubricant pressure in the bearing and in valvular controlled communication with the said working face.

7. In the lubrication of machine bearings, in combination, a lubricant feed chamber of variable volume adapted to deliver lubricant under pressure to the working face of a bearing, and a further chamber of variable volume pressure loading said feed chamber and in valvular controlled communication with the said working face, said valvular control actuated by the starting and stopping devices of the machine.

8. In the lubrication of bearings, in combination, a lubricant feed chamber of variable volume adapted to deliver lubricant under pressure to the working face of a bearing, and a further chamber of variable volume pressure loading said feed chamber and controlled by the lubricant pressure in the bearing and in valvular controlled communication with the said working face and an oil reservoir.

9. In the lubrication of machine bearings, in combination, a lubricant feed chamber of variable volume adapted to deliver lubricant under pressure to the working face of a bearing, additional means controlled by the pressure in the bearing for pressure loading said chamber, said means in valvular controlled communication with the said working face, and an oil reservoir, said valvular control adapted to be actuated by the speed control starting and stopping gear devices of the machine.

10. In the lubrication of machine bearings, in combination, a lubricant feed chamber of variable volume adapted to deliver lubricant under pressure to the working face of a bearing, and a further chamber of variable volume arranged to pressure load said first chamber and controlled by the pressure at the working face of the bearing, said further chamber communicating with said face under valvular control actuated by the starting, stopping and speed control devices of the machine.

11. In the lubrication of machine bearings, in combination, a lubricant feed chamber of variable volume adapted to deliver lubricant under pressure to the working face of a bearing, a further chamber of variable volume arranged to pressure load said first chamber and controlled by the pressure at the working face of the bearing, said further chamber communicating with said face, and an oil reservoir under valvular control actuated by the starting, stopping and speed control devices of the machine.

12. In the lubrication of bearings, in combination, a loaded accumulator having two chambers of simultaneously variable volume whereof one is adapted to deliver lubricant under pressure to the bearing, and a valve adapted to allow alternately the admission of fluid under pressure from the bearing to the other of said chambers, and its discharge therefrom, whereby the volume of each chamber is varied.

13. In lubricating apparatus for a machine bearing a chamber of variable volume containing lubricant, a channel connecting said chamber to the working face of said bearing, and a valve controlling said channel and operated conjointly by the moving parts of said chamber and by the starting apparatus of said machine.

14. In lubricating apparatus for a machine bearing, a bearing element having a port or ports on its working face, a loaded accumulator, and a valve controlled by the starting gear of said machine, whereby lubricant is alternately admitted into a plurality of chambers of said accumulator during the running of the bearing and discharged to said working face from one of said chambers during the stopping or starting of said bearing.

15. In lubricating apparatus for a bearing, and in combination with an accumulator comprising two chambers adapted to contain lubricant, valve-gear connecting alternately both of said chambers to the working face of said bearing, to receive lubricant therefrom, and one of said chambers to the well of said bearing, or to a like reservoir of lubricant, while the other channel is connected to the said working face, to discharge lubricant thereto.

16. In lubricating apparatus for a machine bearing, and in combination with a chamber of variable volume adapted to supply lubricant under pressure to said bearing, a plurality of valves controlling said supply, whereof one is actuated by the starting apparatus of said machine, and another is actuated by a speed-governor device according to the speed of said bearing.

17. In lubricating apparatus, and in combination with a chamber of variable volume adapted to supply lubricant to a bearing element, a plurality of ports in the working face of said element, a valve adapted alternately to open and interrupt said supply of lubricant, and a governor device adapted to operate said valve according to the existence of a preponderance of pressure in one or other of said ports.

18. In lubricating apparatus for a bearing, and in combination with a bearing element having a port opening on its working face, an accumulator comprising two chambers, one of said chambers being permanently in connection with the said port, and a valve communicating with the other chamber and alternately making connection from said chamber to a supply of fluid under pressure, and from said chamber to the well of said bearing.

19. In lubricating apparatus for a bearing of a machine and comprising an accumulator, a valve controlling said accumulator, a link-element connected to the starting and stopping gear of said machine and serving to operate the said valve, and a tappet mechanism actuated by the moving parts of said accumulator and serving to put the said link element alternately into and out of engagement with said valve.

20. In lubricating apparatus for a bearing of a machine and comprising an accumulator, a valve controlling the said accumulator, a link element connected to the starting and stopping gear of the said machine and serving to operate the said valve, and a tappet mechanism actuated by said link mechanism and adapted alternately to lock and release the moving parts of said accumulator.

In testimony whereof I have hereunto set my hand.

ANTHONY GEORGE MALDON MICHELL.

Copies of this patent may be obtained for five cents each, by addressing the "Commissioner of Patents, Washington, D. C."